US005815169A

United States Patent [19]

Oda

[11] Patent Number: 5,815,169

[45] Date of Patent: Sep. 29, 1998

[54] FRAME MEMORY DEVICE FOR GRAPHICS ALLOWING SIMULTANEOUS SELECTION OF ADJACENT HORIZONTAL AND VERTICAL ADDRESSES

[75] Inventor: Mamoru Oda, Noda, Japan

[73] Assignee: Sharp Kabushiki Kaisha, Osaka, Japan

[21] Appl. No.: 613,673

[22] Filed: Mar. 11, 1996

[30] Foreign Application Priority Data

Apr. 10, 1995 [JP] Japan .................................... 7-084167

[51] Int. Cl.[6] ........................................................ G06F 12/06

[52] U.S. Cl. ............................................ 345/517; 345/508

[58] Field of Search .................................... 395/501, 509, 395/510, 515, 517; 345/185, 189, 190, 201, 501, 507, 509, 510, 508, 517, 515

[56] References Cited

U.S. PATENT DOCUMENTS

| | | | |
|---|---|---|---|
| 4,460,958 | 7/1984 | Christopher et al. | 395/410 |
| 5,321,809 | 6/1994 | Aranda | 395/508 |
| 5,404,448 | 4/1995 | Bowen et al. | 395/517 |
| 5,561,777 | 10/1996 | Kao et al. | 395/515 |

FOREIGN PATENT DOCUMENTS

| | | | |
|---|---|---|---|
| 0422299A1 | 10/1989 | European Pat. Off. | G09G 1/16 |
| 627932 | 8/1993 | Japan . | |
| 6175646 | 6/1994 | Japan . | |

*Primary Examiner*—Kee M. Tung

[57] ABSTRACT

A frame memory device for graphics includes a frame memory made up of a pair of memories and a memory controller for controlling the frame memory and is able to smoothly access the frame memory and is improved in its rendering speed. Each memory is logically divided into two banks A and B. Addresses in the thus divided bank are arranged in a checker pattern. The memory controller simultaneously selects bank addresses horizontally and vertically adjacent to a bank address currently being accessed.

14 Claims, 5 Drawing Sheets

COLUMN-ADDRESS IN HORIZONTAL DIRECTION

ROW-ADDRESS IN VERTICAL DIRECTION

| | | | | | |
|---|---|---|---|---|---|
| A0 | B0 | A1 | B1 | A2 | B2 |
| Am | Bm | Am+1 | Bm+1 | Am+2 | Bm+2 |
| An | Bn | An+1 | Bn+1 | An+2 | Bn+2 |
| : | : | : | : | : | : |
| : | : | : | : | : | : |
| : | : | : | : | : | : |
| ⋮ | ⋮ | ⋮ | ⋮ | ⋮ | ⋮ |

FRAME MEMORY DEVICE FOR GRAPHICS ALLOWING SIMULTANEOUS SELECTION OF ADJACENT HORIZONTAL AND VERTICAL ADDRESSES

BACKGROUND OF THE INVENTION (1) Field of the Invention

The present invention relates to a frame memory device for graphics for use in computer graphics technology, and in particular to a frame memory device for graphics in which access to a frame memory is accelerated.

(2) Description of the Prior Art

In recent years, computer graphics created by graphics systems using computers have been widely used in various fields. Typical fields of applications include CAD systems for a design, simulation systems for aviation, controls and the like, and video games. Computer graphics produce two-or three-dimensional pictorial images on the visual screen by processing image data stored in frame memories.

FIG. 5 is a block diagram showing a conventional standard graphics display apparatus. This display apparatus includes: a frame memory 50 which is composed of a DRAM (Dynamic Random Access Memory) and stores image data consisting of digital signals; a pulse generator 51 generating a clock signal; a memory controller 52 producing control signals in conformity with the clock signal from the pulse generator 51 and sending it toward the frame memory 50; and a D/A converter 53 converting the digital signals from the frame memory 50 into analog signals (video signals).

In general, access to the frame memory 50 is done by serial access. Specifically, the address number at the time of accessing to the frame memory 50 sequentially increases up to the number of a predetermined horizontal resolution (the number of pixels) of the display screen. When the selected address reaches the value of the predetermined horizontal resolution, the operation goes to the next line (raster). Thus, the access to the frame memory 50 is performed by successively supplying column-addresses to the frame memory 50. Accordingly, the row-address forms the upper digits over the column-address.

In view of the above background, a device called synchronous DRAM has been proposed which is to effect sequential access operations. A synchronous DRAM is a memory device which is designed to accelerate sequential access to addresses along the horizontal direction. This memory is characterized by its needlessness of specifying the row and column addresses every time access to the memory is to be made. Once the starting address is specified, a predetermined number of data can be written or read in synchronism with the clock signal output from a pulse generator.

A memory of this kind has a pair of cell blocks which are called 'bank'. This configuration makes it possible to select the address in one of the banks while the other bank is being accessed. Since the addresses are assigned alternately, it is possible to perform continuous access to the memory. For example, as in an address arrangement shown in FIG. 6, addresses in first and second banks A and B are arranged alternately in every column. That is, address B0 will be selected during the period in which access address A0 is being made, whereby it is possible to access address B0 continuously after the completion of the access to address A0.

Thus, by accessing the frame memory with skipped addresses at regular intervals in place of accessing the memory with sequential continuous addresses, it can be avoided that read and write of data to a frame memory occur in the same frame memory and therefore it is possible to realize efficient access to the frame memory. This accessing scheme is called interleaving technique. Here, it should be understood that as to the read and write operations, various techniques such as of changing control signals supplied to the memory (Japanese Patent Application Laid-Open Hei 06 No.27,932) or providing buffers (Japanese Patent Application Laid-Open Hei 06 No.175,646) have been proposed in order to avoid the simultaneous access to the frame memory.

To sum up, the operation in the conventional display apparatus for graphics shown in FIG.5, is carried out by selecting an address of data for the frame memory 50, accessing the address thus designated, reading image data from the frame memory 50, converting the image data into analog signals (video signals) in the D/A converter 53, and thus the image is displayed on the display screen.

Computer display technology for displaying three-dimensional graphics often uses so-called polygons or polygonal-pictorial representations. The polygon is divided into triangles and each of the thus produced triangles is filled with pixels with a certain color to represent objects on the display screen. FIG. 7 shows a pixel arrangement on the display screen. This figure shows a case in which a triangle is rendered. Here, locations of pixels on the screen can be designated by screen addresses (row and column addresses). Addresses on the frame memory are arranged in correspondence with the screen addresses of pixels so as to store the data on individual pixels.

In general, graphics display apparatuses of rendering the polygon have frequent occasions for rendering pictorial drawings in both horizontal and vertical directions as shown in FIG. 7. However, the conventional display apparatus is made up of a frame memory using serial access as stated above, which is mainly designed to draw images in the horizontal direction. For this reason, in the display apparatus aiming at drawing of three-dimensional graphics, it is necessary to designate row and column addresses by means of the memory controller every time the display image is moved in the vertical (raster) direction. This makes the address control complicated and retards the drawing speed.

SUMMARY OF THE INVENTION

It is therefore an object of the present invention to provide a frame memory device for graphics in which access to a frame memory is smoothly performed to improve the speed of drawing.

In accordance with an aspect of the invention, there is provided a frame memory device for graphics which includes a frame memory having a matrix of addresses arranged on plural lines in correspondence with pixels arranged on a display screen, the frame memory being logically partitioned into four banks A through D, addresses on the banks A and B are arranged alternately on odd lines in the matrix while addresses on the banks C and D are arranged alternately on even lines; and a controller for controlling the frame memory, the controller selecting addresses horizontally and vertically adjacent to an address currently being accessed.

In the above configuration, the frame memory includes a first memory logically partitioned into the bank A and the bank B; and a second memory logically partitioned into the bank C and the bank D the controller includes a first address adder for converting an access address into a next address; a first selector setting up an offset value with reference to the number of memory banks defining the horizontal size of the frame memory; a second address adder for adding the offset value to the next address converted in the first address adder; a second selector selecting one of output values from the first address adder and the second address adder based on which line in the matrix the access address belongs to, and the address selection in the bank A or the bank B is performed by defining the output value from the second selector as an address while the address selection in the bank C or the bank D is performed by defining the output value from the first address adder as an address.

As stated above, in accordance with the invention, the frame memory is logically partitioned into the four banks A through D, and addresses in the banks A and B are alternately arranged on odd lines in the matrix while addresses in the banks C and D are alternately arranged on even lines. The controller selects both addresses horizontally and vertically adjacent to an address being currently accessed. As a result, when the polygon is rendered, the pictorial drawing can be done in either direction, horizontal or vertical direction without needing to select the row and column addresses in the frame memory every time access is made. That is, the access to predetermined addresses can be done in a moment, whereby it is possible to improve the drawing speed. Accordingly, if access in the vertical direction is to be made upon the use of the memory capable of high-speed serial access, it is no longer necessary to perform address-selection of row and column every time the access is to be made, whereby it is possible to realize a further improved high-speed access.

When memories such as synchronous DRAMs and the like whose memory area is originally partitioned into two banks is used, it is possible to readily realize the high-speed access stated above.

When the controller including the first address adder, the first selector, the second address adder and the second selector is used, address selection in the bank A or bank B is done by setting up the output value from the second selector as its address while address selection in the bank C or bank D is done by setting up the output value from the first address adder as its address. In this way, the addresses horizontally and vertically adjacent to an address being currently accessed can be selected.

Further advantages and features of the invention as well as the scope, nature and utilization of the invention will become apparent to those skilled in the art from the description of the preferred embodiments of the invention set forth below.

DESCRIPTION OF THE PREFERRED EMBODIMENTS

Embodiments of the invention will hereinafter be described with reference to the accompanying drawings.

Figure 1:
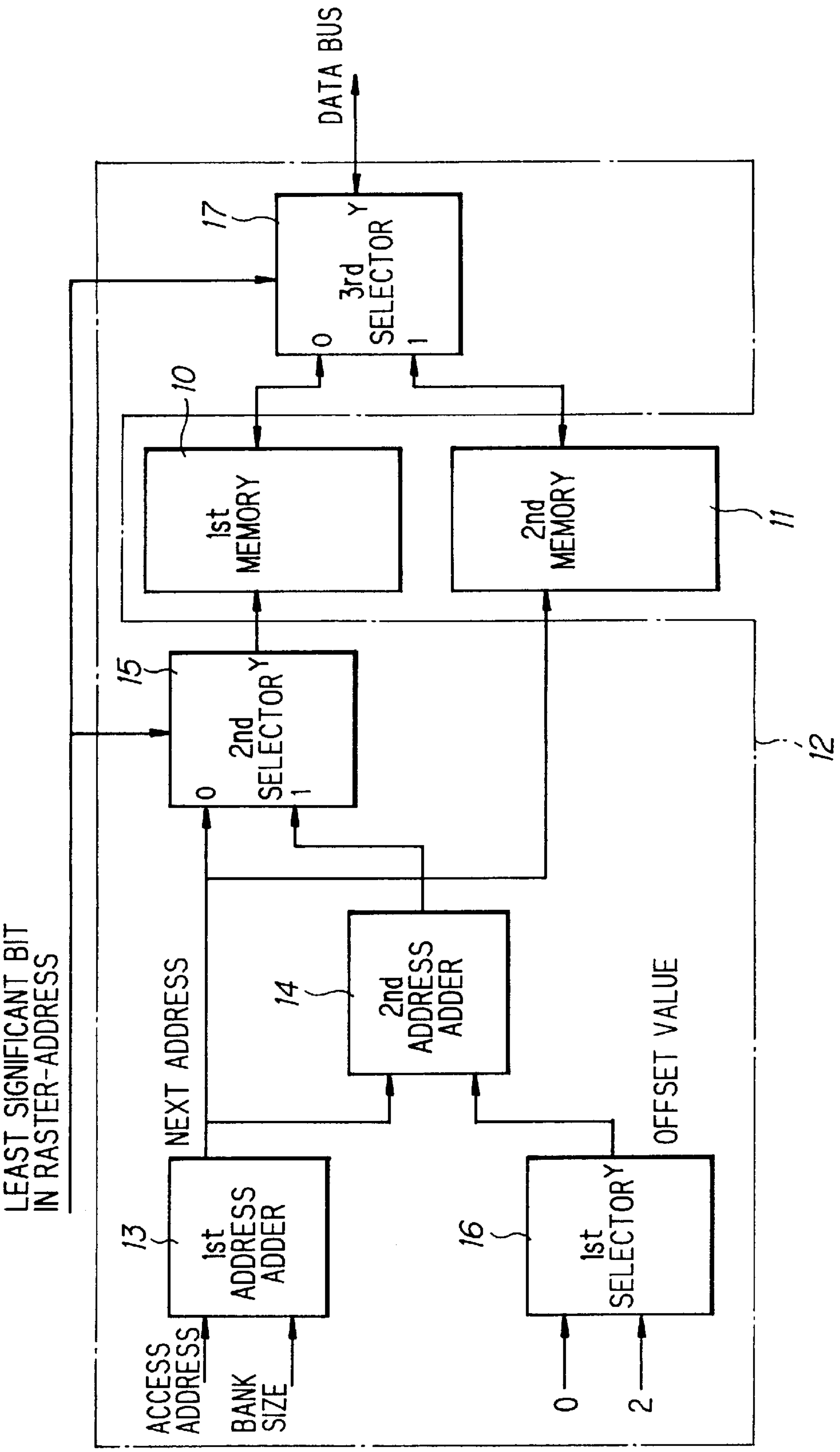
FIG. 1 is a block diagram showing an embodiment of a frame memory device for graphics in accordance with the invention.

FIG. 1 is a block diagram showing an embodiment of a frame memory device for graphics in accordance with the invention. This frame memory device for graphics includes a frame memory made up of a pair of first and second memories 10 and 11, and a memory controller 12 as a controlling means for controlling the frame memory. This memory controller 12 is composed of a first address adder 13, a second address adder 14, a first selector 16, a second selector 15 and a third selector 17.

Figure 2:
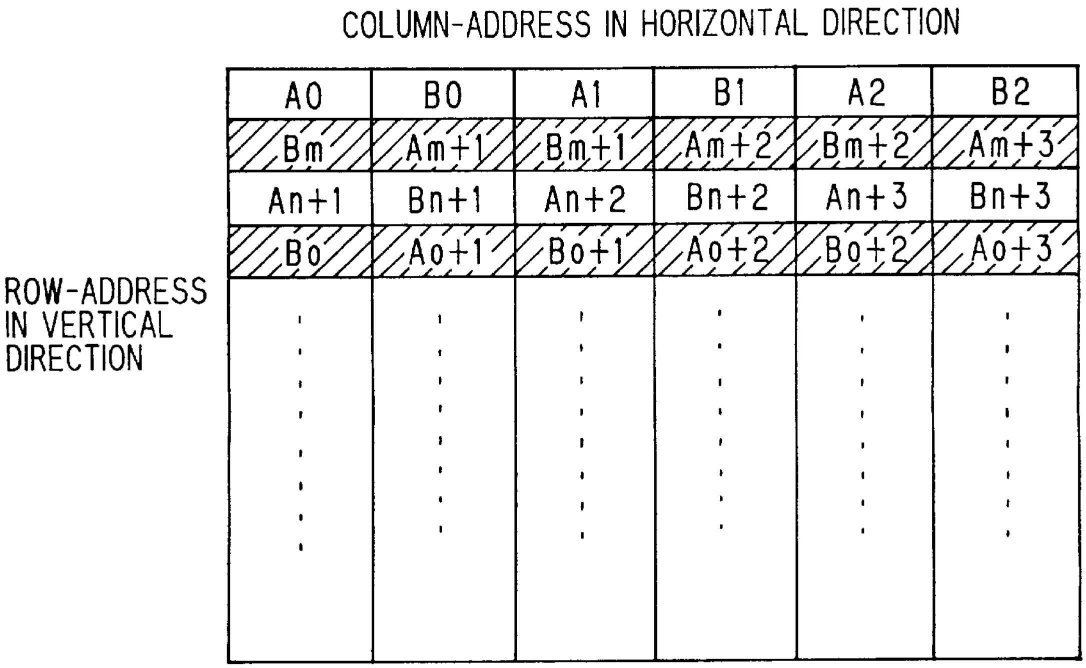
FIG. 2 is a diagram showing an arrangement of bank addresses in a frame memory in accordance with the invention.

FIG. 2 shows an arrangement diagram of bank addresses in this frame memory.

The first and second memories 10 and 11 are made up of synchronous DRAMs. Each of the memories 10 and 11 is logically partitioned into two banks, namely, first bank A and second bank B. As shown in FIG. 2, A and B in frames indicate bank names and their numerals designate addresses in the banks. Addresses in the frame memory is allocated in the following manner. That is, addresses on the first bank A and second bank B in the first memory 10 are arranged alternately on odd lines while addresses on the first bank A and second bank B in the second memory 11 are arranged alternately on even lines. Further, along the vertical direction, addresses on first banks A and second banks B are arranged in an alternate manner, to thereby form a checker pattern with the addresses on the first and second banks A and B.

In a synchronous DRAM, if a certain address on a bank is being currently accessed, it is impossible to simultaneously select another address on the same bank. For this reason, in order to realize continuous accesses, one of banks is currently being accessed while an address on the other bank is selected. More specifically, while in the same memory the first bank A is being accessed, a certain address on the second bank B is selected so as to perform continuous data access. On the other hand, while data of the second bank B is being accessed, a certain address on the first bank A is selected so as to perform the next data access. Further, when the neighboring bank is addressed, the bank address (on the next line) right below the address being currently accessed is selected to enable continuous data access in vertical direction even if the polygonal-pictorial rendering is moved vertically.

Now, description will be made on the operation of the frame memory device for graphics.

The bank address currently accessed (to be referred to as an access address) is converted into an address to be designated next by the first address adder 13. This next address thus converted is supplied to 0-input of the second selector 15. An offset value is set up in the first selector 16 based on the number of memory banks defining the horizontal size of the frame memory. This value may be set at 0 or 2, for example. Detailed description as to this value will be made later. If the raster-address (address in the vertical direction) on an odd line is accessed, the offset value is supplied from the first selector 16 to the second address adder 14, and the offset value is added to the next address output from the first address adder 13. This added value is supplied to 1-input of the second selector 15. The least significant bit of the raster-address is input as a selection signal to the second selector 15. Therefore, if a raster-address on an odd line is accessed, the next address is selected, while if a raster-address on an even line is accessed, the address made of the next address plus the offset value is selected and supplied to the first memory 10. The next address is input from the first address adder 13 to the second memory 11. Data is input to the third selector 17 through the data bus. The third selector 17 is further supplied with the least significant bit of the raster-address as a selection signal. Accordingly, when a raster-address on an odd line is accessed, the first memory 10 is selected. When a raster-address on an even line is accessed, the second memory 11 is selected. Thus, the data is selected for input.

Figure 3:
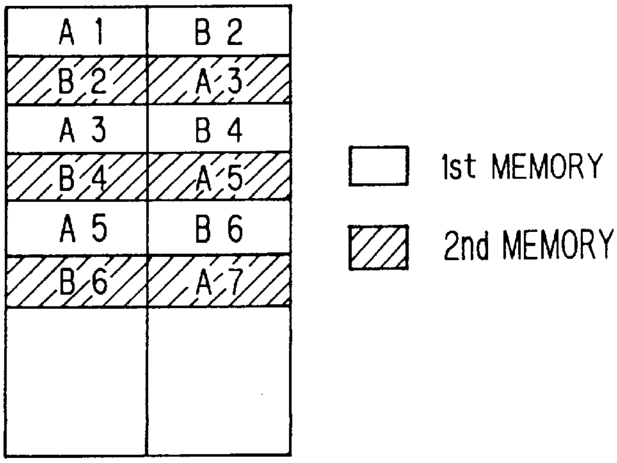
FIG. 3 is a diagram showing an arrangement of bank addresses when the horizontal size of a frame memory is two times as large as the size of a bank.

Next, a specific example will be shown. Suppose that the first and second memories 10 and 11 each have a horizontal size of 512 addresses with a bank size of 256 addresses. Therefore, once either of the banks is accessed by selecting a bank address, 256 addresses can be successively accessed without selecting the address one by one. In this case, the number of memory banks is two. The arrangement of addresses in this frame memory is shown in FIG. 3.

When a raster-address on an odd line is accessed, for example, if a bank address A1 in the first memory 10 is accessed, the first address adder 13 generates a next bank address B2. At this moment, the least significant bit of the raster-address is 0, the second selector 15 selects 0-input so that the next address B2 is selected in the first memory 10. At the same time, the address B2 is also selected in the second memory 11.

When a raster-address on an even line is accessed, for example, if a bank address B2 in the second memory 11 is accessed, the first address adder 13 generates a next bank address A3. Accordingly, the bank address A3 is selected in the second memory 11. At this moment, since the least significant bit of the raster-address is 1, the second selector 15 selects 1-input so that the value output from the second address adder 14 is set up as the address. Here, since the horizontal size of the frame memory is two times as large as the bank size, the offset value of the first selector 16 is to be set at 0. This offset value is added to the next bank address in the second address adder 14 so that the address A3 is selected in the first memory 10.

Figure 4:
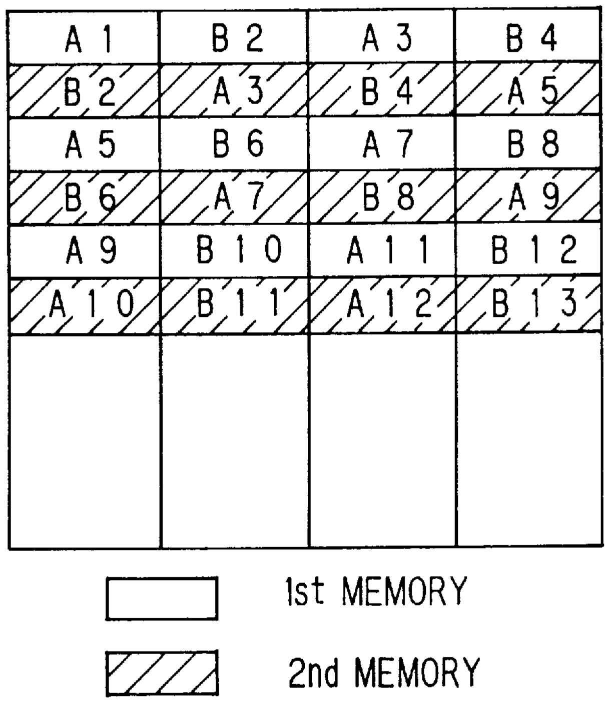
FIG. 4 is a diagram showing an arrangement of bank addresses when the horizontal size of a frame memory is four times as large as the size of a bank.
Figures 5, 6:
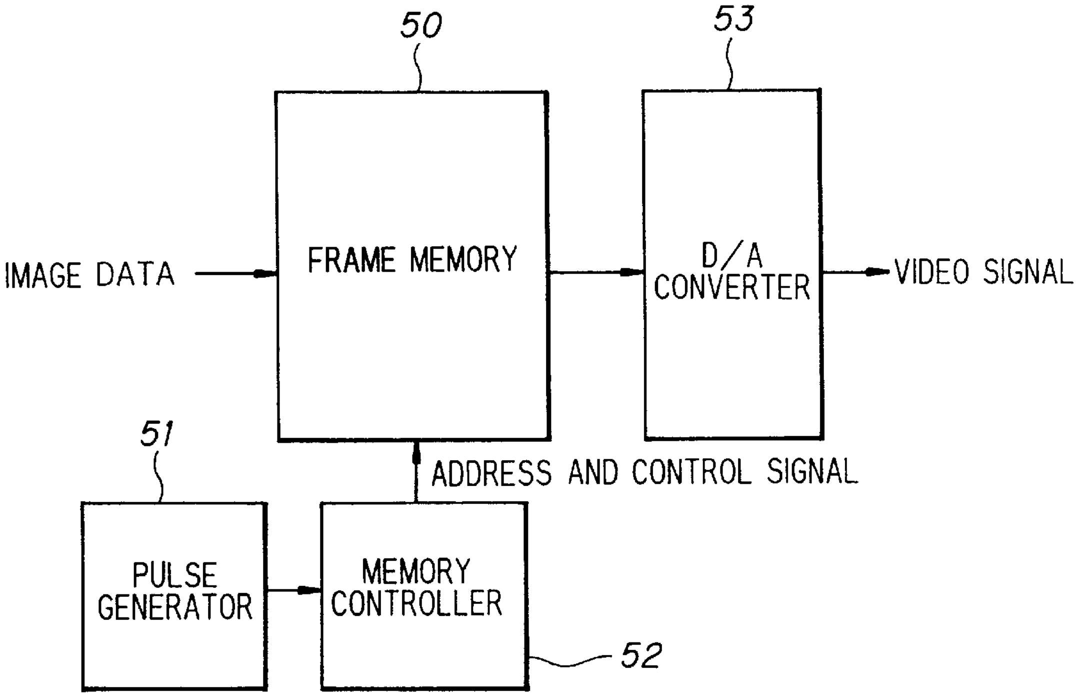
Fig.5 Prior Art
Fig.6 Prior Art
FIG. 5 is a block diagram showing a conventional display apparatus for graphics.
FIG. 6 is a diagram showing an arrangement of bank addresses in a conventional frame memory.
Figure 7:
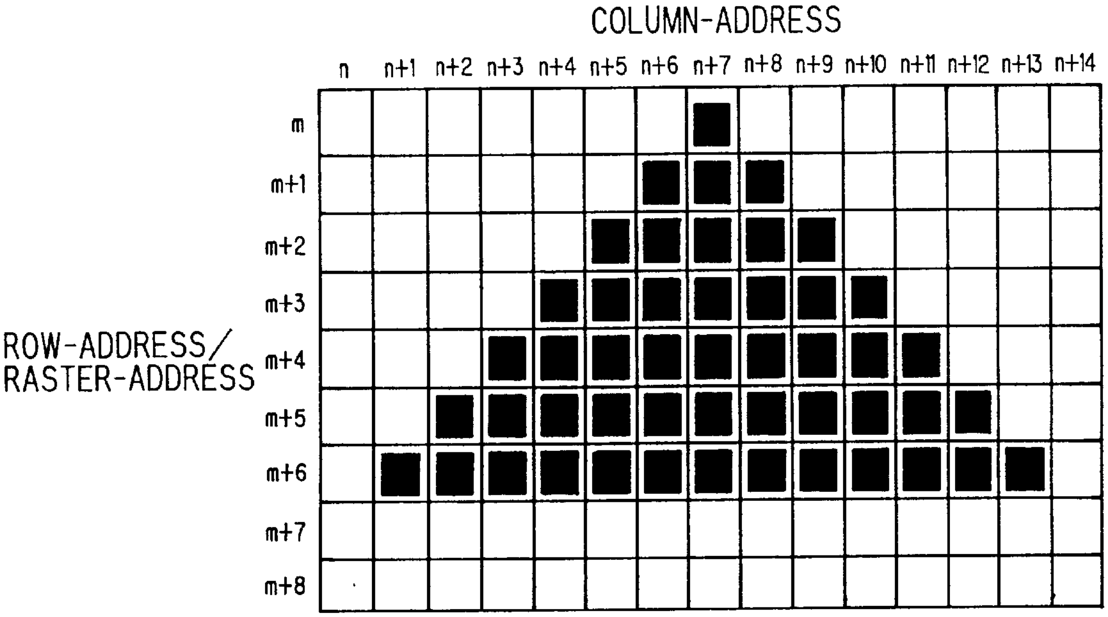
Fig.7 Prior Art
FIG. 7 is a diagram showing an arrangement of pixels for displaying the polygon.

If the horizontal size of the frame memory is four times as large as the bank size as shown in FIG. 4, or if the number of memory banks is four, the offset value is set at 2. For example, if a bank address B2, which is a raster-address on an even line, in the second memory 11 is accessed, A3 is selected as the bank address in the second memory 11 while the output value from the second address adder 14 is set up as the address in the first memory 10. That is, A5 which is created by adding the next bank address A3 and the offset value '2' is selected in the first memory 10.

As the selection of an address in the frame memory is thus performed, the next data access can smoothly be done. In other words, when data on a bank A in the first memory 10 is accessed, there are two cases, i.e. the polygon is successively rendered in the horizontal direction or the polygon is rendered moving a next raster (row). Accordingly, the address on the bank B in the first memory 10 is selected, and at the same time the address which is located right below the currently accessed address on the bank A in the first memory 10 and belongs to the bank B in the second memory 11 is selected. By this scheme, continuous access to the neighboring bank can be performed and at the same time even if the access to the data is moved in the vertical direction continuous access becomes possible without stopping the operation.

The present invention should not be limited to the above configuration. A single frame memory may be logically partitioned into four banks or a plurality of frame memories may be logically partitioned into four banks.

What is claimed is:

1. A frame memory device for graphics comprising:

a frame memory having a matrix of addresses arranged on plural lines in correspondence with pixels arranged on a display screen, said frame memory being logically partitioned into four banks A through D, addresses on the banks A and B are arranged alternately on odd lines in said matrix while addresses on the banks C and D are arranged alternately on even lines; and controlling means for controlling said frame memory, said controlling means simultaneously selecting addresses horizontally and vertically adjacent to an address currently being accessed.

2. A frame memory device for graphics according claim 1, wherein said frame memory comprises: a first memory logically partitioned into said bank A and said bank B; and a second memory logically partitioned into said bank C and said bank D.

3. A frame memory device for graphics according to claim 2, wherein said controller adds an offset address to a next address for said first memory when said address currently being accessed is the said second memory.

4. A frame memory device for graphics according to claim 3, wherein said offset is determined in accordance with a horizontal size of said frame memory.

5. A frame memory device for graphics according to claim 1, wherein said controller performs said selecting in accordance with a horizontal size of said frame memory.

6. A frame memory device for graphics comprising:

a frame memory having a matrix of addresses arranged on plural lines in correspondence with pixels arranged on a display screen, said frame memory being logically partitioned into four banks A through D, addresses on the banks A and B are arranged alternately on odd lines in said matrix while addresses on the banks C and D are arranged alternately on even lines; and controlling means for controlling said frame memory, said controlling means selecting addresses horizontally and vertically adjacent to an address currently being accessed, wherein said controlling means comprises:

a first address adder for converting an access address into a next address;

a first selector setting up an offset value with reference to the number of memory banks defining the horizontal size of said frame memory;

a second address adder for adding the offset value to the next address converted in said first address adder;

a second selector selecting one of output values from said first address adder and said second address adder based on which line in said matrix the access address belongs to, and the address selection in said bank A or said bank B is performed by defining the output value from said second selector as an address while the address selection in said bank C or said bank D is performed by defining the output value from said first address adder as an address.

7. A frame memory device for graphics according to claim 6, wherein said frame memory comprises:

a first memory logically partitioned into said bank A and said bank B; and a second memory logically partitioned into said bank C and said bank.

8. A method for accelerating access to a frame memory for graphics comprising:

arranging a matrix of addresses of the frame memory on plural lines in correspondence with pixels arranged on a display screen;

logically partitioned the frame memory into four banks A through D, arranging addresses on the banks A and B alternately on odd lines in said matrix and arranging addresses on the banks C and D alternately on even lines; and controlling the frame memory including simultaneously selecting addresses horizontally and vertically adjacent to an address currently being accessed.

9. The method according claim 8, further comprising dividing the frame memory into a first memory logically partitioned into said bank A and said bank B, and a second memory logically partitioned into said bank C and said bank D.

10. The method according claim 9, wherein said controlling includes:

converting an access address into a next address, setting up an offset value with reference to the number of memory banks defining the horizontal size of the frame memory;

adding the offset value to the next address output by said converting;

selecting one of output values by said converting and said adding based on which line in said matrix the access address belongs to;

performing address selection in said bank A or said bank B by defining the output value by said adding as an address; and performing address selection in said bank C or said bank D by defining the output value by said converting as an address.

11. The method according to claim 9, wherein said controlling includes adding an offset address to a next address for said first memory when said address currently being accessed is the said second memory.

12. The method according to claim 11, further comprising determining said offset in accordance with a horizontal size of said frame memory.

13. The method according claim 8, wherein said controlling includes:

converting an access address into a next address, setting up an offset value with reference to the number of memory banks defining the horizontal size of the frame memory;

adding the offset value to the next address output by said converting;

selecting one of output values by said converting and said adding based on which line in said matrix the access address belongs to;

performing address selection in said bank A or said bank B by defining the output value by said adding as an address; and performing address selection in said bank C or said bank D by defining the output value by said converting as an address.

14. The method according to claim 8, wherein said selecting is in accordance with a horizontal size of said frame memory.

* * * * *